(12) United States Patent
Jones et al.

(10) Patent No.: US 10,960,944 B2
(45) Date of Patent: Mar. 30, 2021

(54) TRACK PAD GEOMETRY FOR HARD SURFACES

(71) Applicant: Caterpillar Inc., Peoria, IL (US)

(72) Inventors: Benjamin Isaac Jones, Bartonville, IL (US); Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 226 days.

(21) Appl. No.: 15/921,338

(22) Filed: Mar. 14, 2018

(65) Prior Publication Data

US 2019/0283819 A1 Sep. 19, 2019

(51) Int. Cl.
| | |
|---|---|
| *B62D 55/26* | (2006.01) |
| *B62D 55/21* | (2006.01) |
| *B62D 55/28* | (2006.01) |
| *B62D 55/20* | (2006.01) |

(52) U.S. Cl.
CPC ........... *B62D 55/26* (2013.01); *B62D 55/202* (2013.01); *B62D 55/21* (2013.01); *B62D 55/28* (2013.01)

(58) Field of Classification Search
CPC .... B62D 55/20; B62D 55/202; B62D 55/205; B62D 55/21; B62D 55/26; B62D 55/275; B62D 55/28
See application file for complete search history.

(56) References Cited

U.S. PATENT DOCUMENTS

| | | | |
|---|---|---|---|
| 1,474,967 A | 11/1923 | Koehring | |
| 1,786,924 A | 12/1930 | Turnbull | |
| 2,452,921 A | 11/1948 | Gillespie | |
| 2,530,379 A | 11/1950 | Davidson | |
| 3,307,882 A * | 3/1967 | Mcfayden | B62D 55/28 305/198 |
| 3,475,060 A | 10/1969 | Kaifesh | |
| 3,847,451 A | 11/1974 | Freedy et al. | |
| 6,543,863 B1 | 4/2003 | Hannan et al. | |
| 7,530,650 B2 * | 5/2009 | Hannan | B62D 55/20 305/201 |
| 9,446,802 B2 | 9/2016 | Weiss et al. | |
| 2003/0034690 A1 | 2/2003 | Hori et al. | |
| 2015/0375813 A1 * | 12/2015 | Talbot | B62D 55/202 305/198 |
| 2016/0185404 A1 * | 6/2016 | Westoby | B62D 55/14 305/201 |
| 2018/0319448 A1 * | 11/2018 | Acosta | B62D 55/26 |
| 2019/0283818 A1 * | 9/2019 | Jones, Jr. | B62D 55/202 |

FOREIGN PATENT DOCUMENTS

WO 9946158 9/1999

* cited by examiner

*Primary Examiner* — Jason R Bellinger

(74) *Attorney, Agent, or Firm* — Law Office of Kurt J. Fugman LLC

(57) ABSTRACT

A track chain member includes a first rib coupling the shoe member to the first lug; and a second rib coupling the shoe member to the second lug, defining a first side recess between the first rib and the second rib. The first side recess also extends from the exterior of the shoe member and underneath the first top surface, the first lateral end defines a first lateral end width along the track chain traveling direction, and the first side recess also spans the majority of the first lateral end width along the track chain traveling direction.

20 Claims, 4 Drawing Sheets

TRACK PAD GEOMETRY FOR HARD SURFACES

TECHNICAL FIELD

The present disclosure relates to track pads used in track chains for heavy equipment using endless track drives. Specifically, the present disclosure relates to track pad geometry suitable for use on hard surfaces.

BACKGROUND

In many current applications, track chain members such as track links or track shoes, or track pads, are attached to each other using a pin that allows the track chain members to rotate relative to each other while still allowing the chain to remain in tension when installed on the undercarriage of a track type vehicle. For heavy equipment, such as electric rope shovels and the like, track pads which incorporates the track rail and track shoe in a single, unitary body are used. In some applications the track pads are required to support the heavy load of the machine on hard surfaces such as rock and the like.

Due to the rigidity of hard surfaces such as rock and the like, the track pad may develop cracks, or experience "toenailing" (elongation of the track pad along the direction of travel) necessitating repair due to the heavy loads exerted on the track pad.

Various track pad geometries are known in the art including the track pad geometry disclosed in U.S. Pat. No. 6,543,863 to Keith Hannan et al. The '863 patent discloses a track shoe for a crawler track that has a hollow body with top and bottom sections and perimeter side walls defining a void therebetween. A supporting pillar is located in the void and extends between the top and bottom sections. The pillar is located in the main loadbearing region of the shoe and bears most of the load on the shoe. This enables the thickness of the side walls to be minimized. The shoe can be manufactured more efficiently by complementing foundry methods. However, the '863 patent requires lost core casting and full heat treating, which increases the cost of the track pad.

Accordingly, there is a need to develop a track pad when used on hard surfaces that is more robust and cost effective to manufacture than has heretofore been devised.

SUMMARY

A track chain member according to an embodiment of the present disclosure comprises a shoe member defining a track chain traveling direction and a lateral direction perpendicular to the track chain traveling direction, the shoe member further defining a first lateral end, a second lateral end, and a ground engaging surface spanning from the first lateral end to the second lateral end; a first lug extending from the shoe member in a first direction parallel to the track chain traveling direction; a second lug extending from the shoe member in a second direction parallel to the track chain traveling direction and opposite to the first direction; the track chain member further defining a first top surface spanning from the first lug to the second lug; a first rib coupling the shoe member to the first lug; and a second rib coupling the shoe member to the second lug, defining a first side recess between the first rib and the second rib, the first side recess also extending from the exterior of the shoe member and underneath the first top surface, the first lateral end defining a first lateral end width along the track chain traveling direction, the first side recess also spanning the majority of the first lateral end width along the track chain traveling direction. The track chain member further defines a midplane along the lateral direction, a first bottom void extending from the ground engaging surface and a second bottom void extending from the ground engaging surface, the first bottom void being disposed on one side laterally of the midplane and the second bottom void being disposed on the other side laterally of the midplane, forming a support pillar therebetween A track chain member according to an embodiment of the present disclosure comprises a shoe member defining a track chain traveling direction and a lateral direction perpendicular to the track chain traveling direction, the shoe member further defining a first lateral end, a second lateral end, and a ground engaging surface spanning from the first lateral end to the second lateral end; wherein the track chain member further defines a midplane along the lateral direction, a first bottom void extending from the ground engaging surface and a second bottom void extending from the ground engaging surface, the first bottom void being disposed on one side laterally of the midplane and the second bottom void being disposed on the other side laterally of the midplane, forming a support pillar therebetween.

A track chain assembly according to an embodiment of the present disclosure comprises a plurality of interlocking track chain members wherein each track chain member defines a track chain traveling direction, a lateral direction perpendicular to the track chain traveling direction, and includes a shoe member defining a first lateral end, a second lateral end, and a ground engaging surface spanning from the first lateral end to the second lateral end; a first rail member extending from the shoe member disposed proximate the first lateral end, and a second rail member extending from the shoe member disposed proximate the second lateral end spaced away from the first rail member, defining a central support region therebetween; a first rib and a second rib extending between the first rail member and the first lateral end of the shoe member, defining a first side recess therebetween; a third rib and a fourth rib extending between the second rail member and the second lateral end of the shoe member, defining a second side recess therebetween; wherein each track chain member further defines a midplane along the lateral direction, a first bottom void extending from the ground engaging surface and a second bottom void extending from the ground engaging surface, the first bottom void being disposed on one side laterally of the midplane and the second bottom void being disposed on the other side laterally of the midplane, forming a support pillar therebetween.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
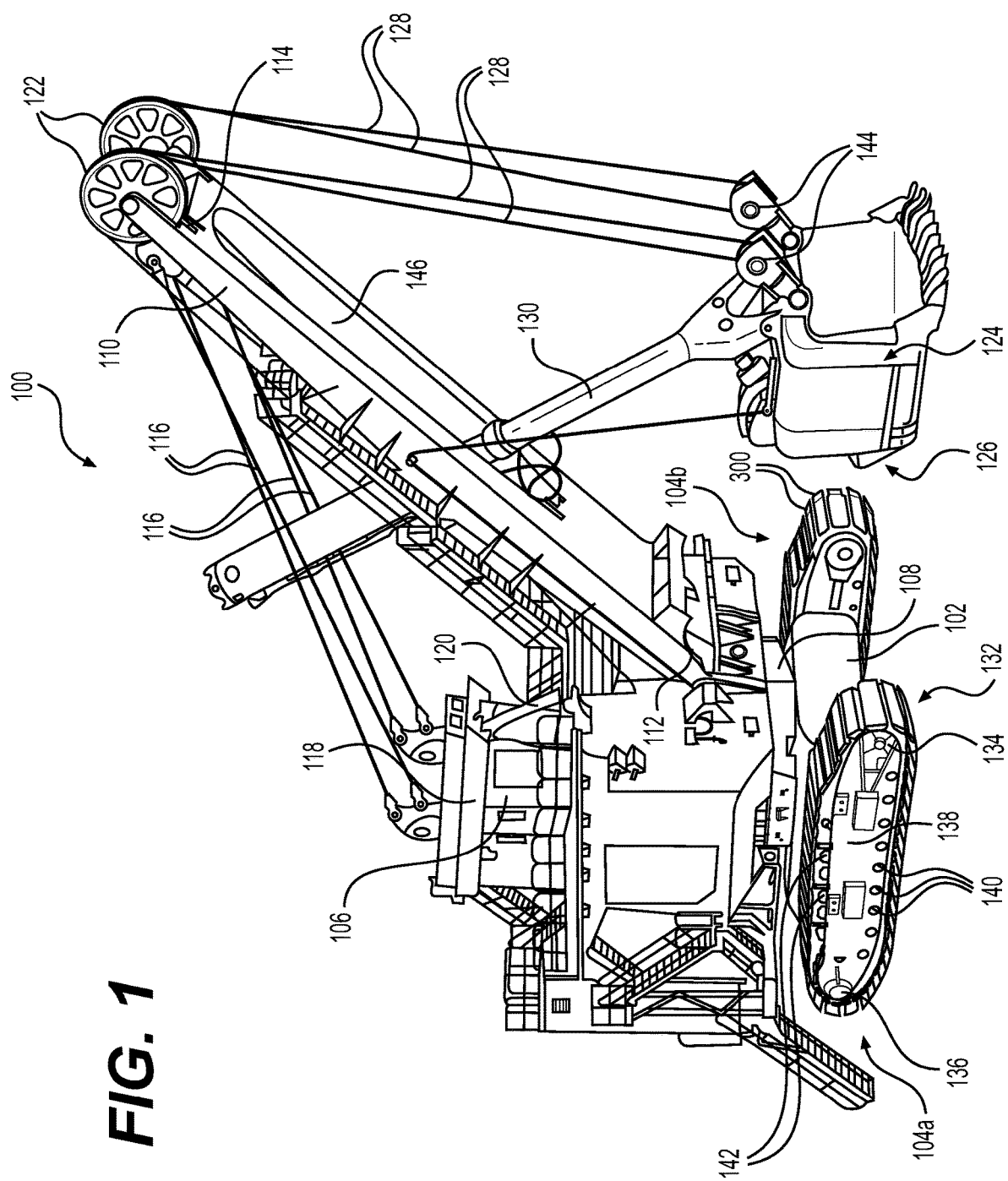
FIG. 1 is a perspective view of a machine such as an electric rope shovel that has track chains that use an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a track chain member, such as a track pad, and a track chain that may use a plurality of track chain members according to various embodiments of the present disclosure, etc. First, a machine that may use such track chain members or such track chains will be discussed.

Referring to FIG. 1, there is shown a machine 100 having a frame 102 (may include a turntable 108) with a track system, including a first track chain 104a and a second track chain 104b positioned at opposite sides of frame 102. Machine 100 is shown in the context of an electric rope shovel having an operator cab 106, a boom 110, a lower end 112 of the boom 110 (also called a boom foot), an upper end 114 of the boom 110 (also called a boom point), tension cables 116, a gantry tension member 118, a gantry compression member 120, a sheave 122 rotatably mounted on the upper end 114 of the boom 110, a dipper bucket 124, a dipper door 126 pivotally coupled to the dipper bucket 124, a hoist rope 128, a winch drum (not shown), and a dipper handle 130. An electric motor controls the winch drum, causing the lower or raising of the boom, dipper bucket, and upward and downward movement of the dipper handle relative to the boom.

Tracks 104a and 104b are part of a machine undercarriage 132 coupled with frame 102 in a conventional manner. Each of tracks 104a and 104b include a plurality of coupled together track shoes forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 may also be associated with each of tracks 104a and 104b to support and guide the tracks opposite rollers 140 during operation.

The unique design of tracks 104a and 104b and the overall track and undercarriage system of which they are a part are contemplated to enable machine 100 to operate in certain environments such as soft underfoot conditions without the shortcomings associated with many earlier designs. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of hydraulic shovel, bull dozer, excavator, back hoe, etc.

The dipper bucket 124 is suspended from the boom 110 by the hoist rope 128. The hoist rope 128 is wrapped over the sheave 122 and attached to the dipper bucket 124 at a bail 144. The hoist rope 128 is anchored to the winch drum (not shown). The winch drum is driven by at least one electric motor (not shown) that incorporates a transmission unit (not shown). As the winch drum rotates, the hoist rope 128 is paid out to lower the dipper bucket 124 or pulled in to raise the dipper bucket 124. The dipper handle 130 is also coupled to the dipper bucket 124. The dipper handle 130 is slidably supported in the saddle block 146, and the saddle block 146 is pivotally mounted to the boom 110 at the shipper shaft (not clearly shown). The dipper handle 130 includes a rack and tooth formation thereon that engages a drive pinion (not shown) mounted in the saddle block 146. The drive pinion is driven by an electric motor and transmission unit (not shown) to extend or retract the dipper handle 130 relative to the saddle block 146.

An electrical power source (not shown) is mounted to the frame 102 to provide power to a hoist electric motor (not shown) for driving the hoist drum, one or more crowd electric motors (not shown) for driving the crowd transmission unit, and one or more swing electric motors (not shown) for turning the turntable 108. In some cases, electric motor powers all of the moving components of the shovel. Each of the crowd, hoist, and swing motors is driven by its own motor controller, or is alternatively driven in response to control signals from a controller (not clearly shown).

The track chains 104a and 104b are considered to be well suited for work in hard underfoot conditions. To this end, the track chains 104a and 104b may be "high ground pressure" tracks, each having track members durable enough to support a relatively large weight of machine 100. Each of track shoe members has a footprint defined in part by front and back edges, and also defined in part by outboard edges and. Each of track shoe members may further include a ground contact area that is equal to its footprint, or less than its footprint only to an extent that adjacent track shoes overlap one another or due to voids disposed on the bottom surface of the track shoe member.

Figure 2:
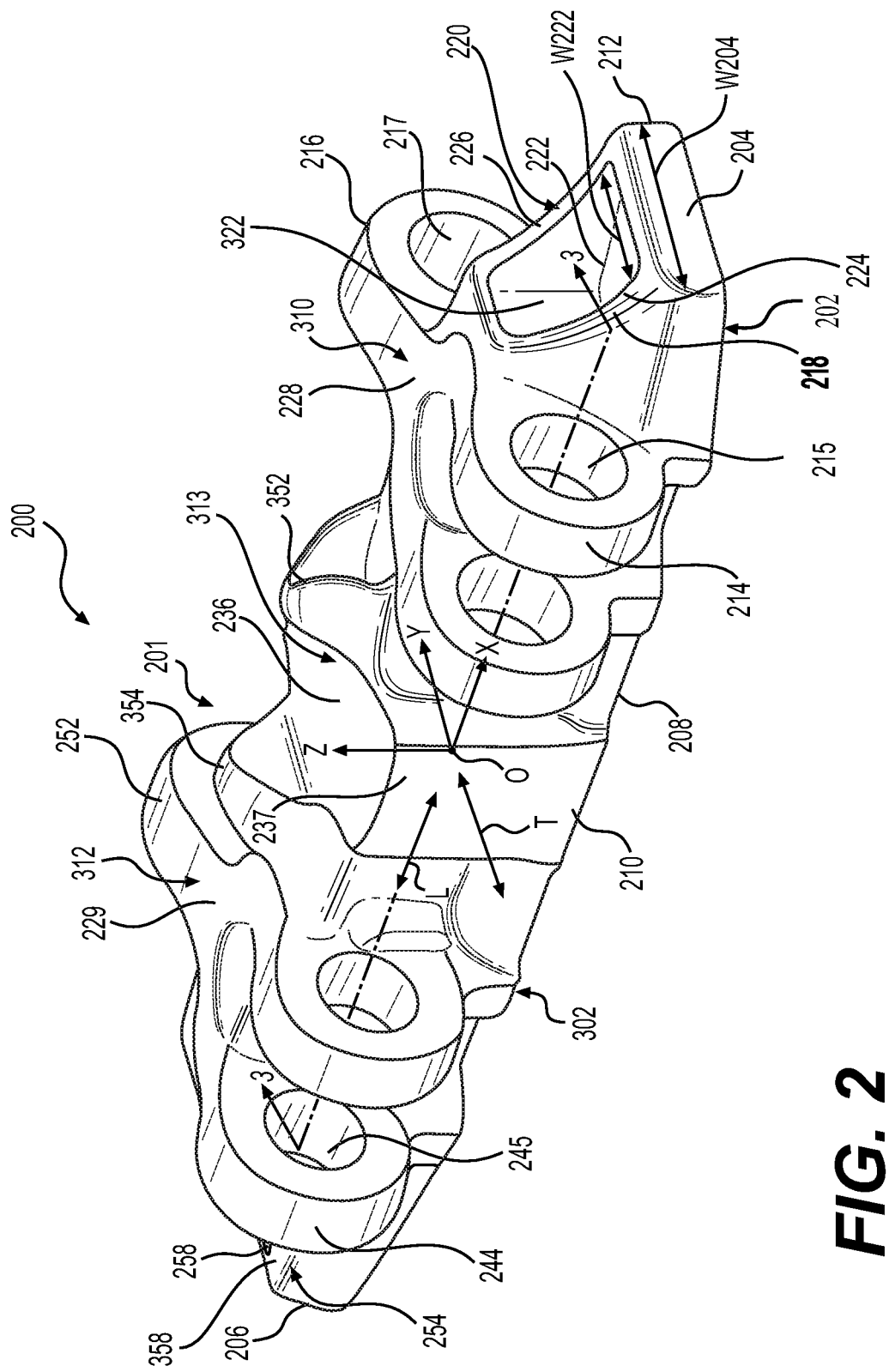
FIG. 2 is a perspective view of track chain member such as a track pad according to an embodiment of the present disclosure that may be used with the machine of FIG. 1.
Figure 3:
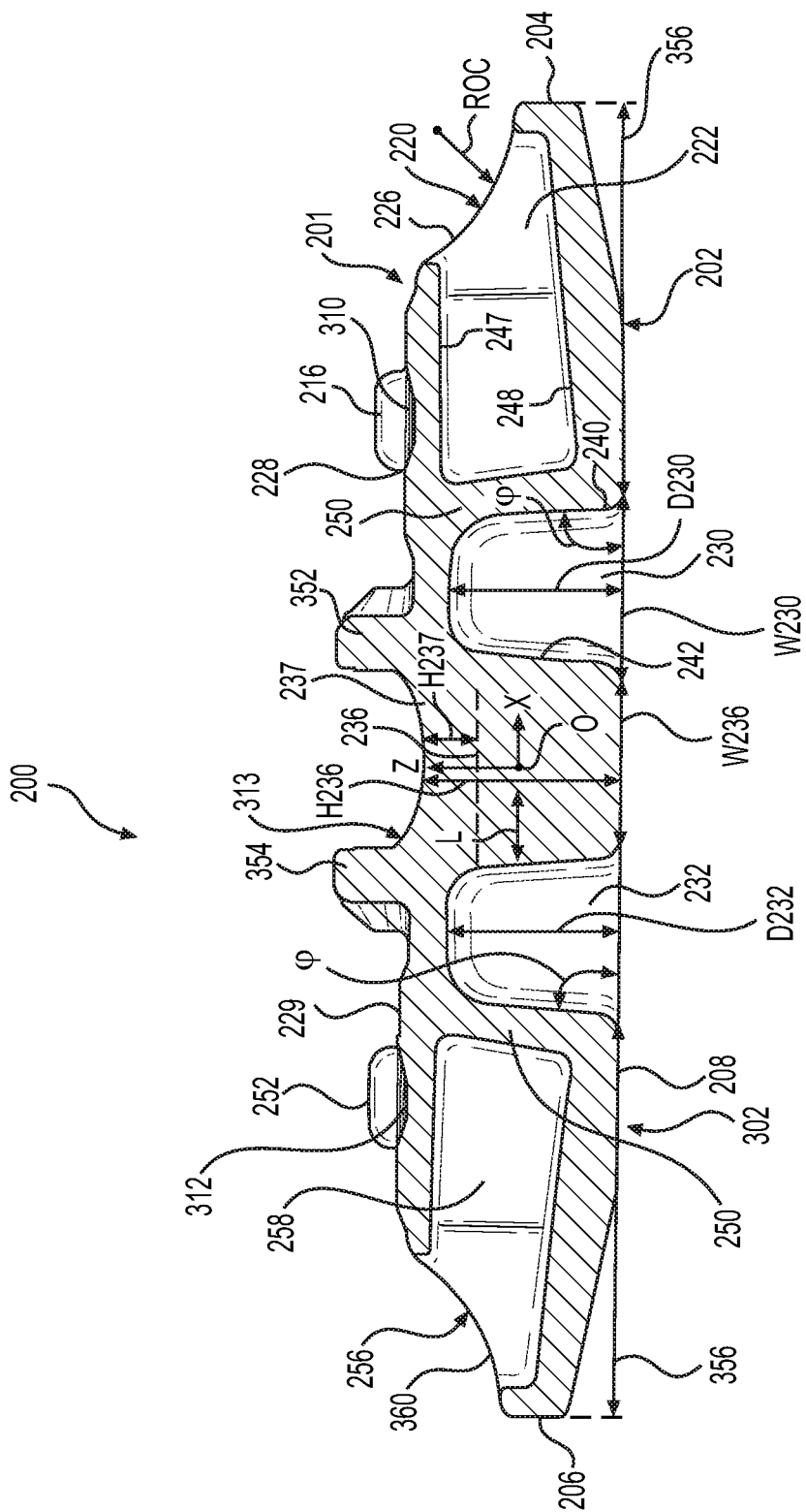
FIG. 3 is a cross-sectional view of the track pad of FIG. 2 taken along lines 3-3 thereof.
Figure 4:
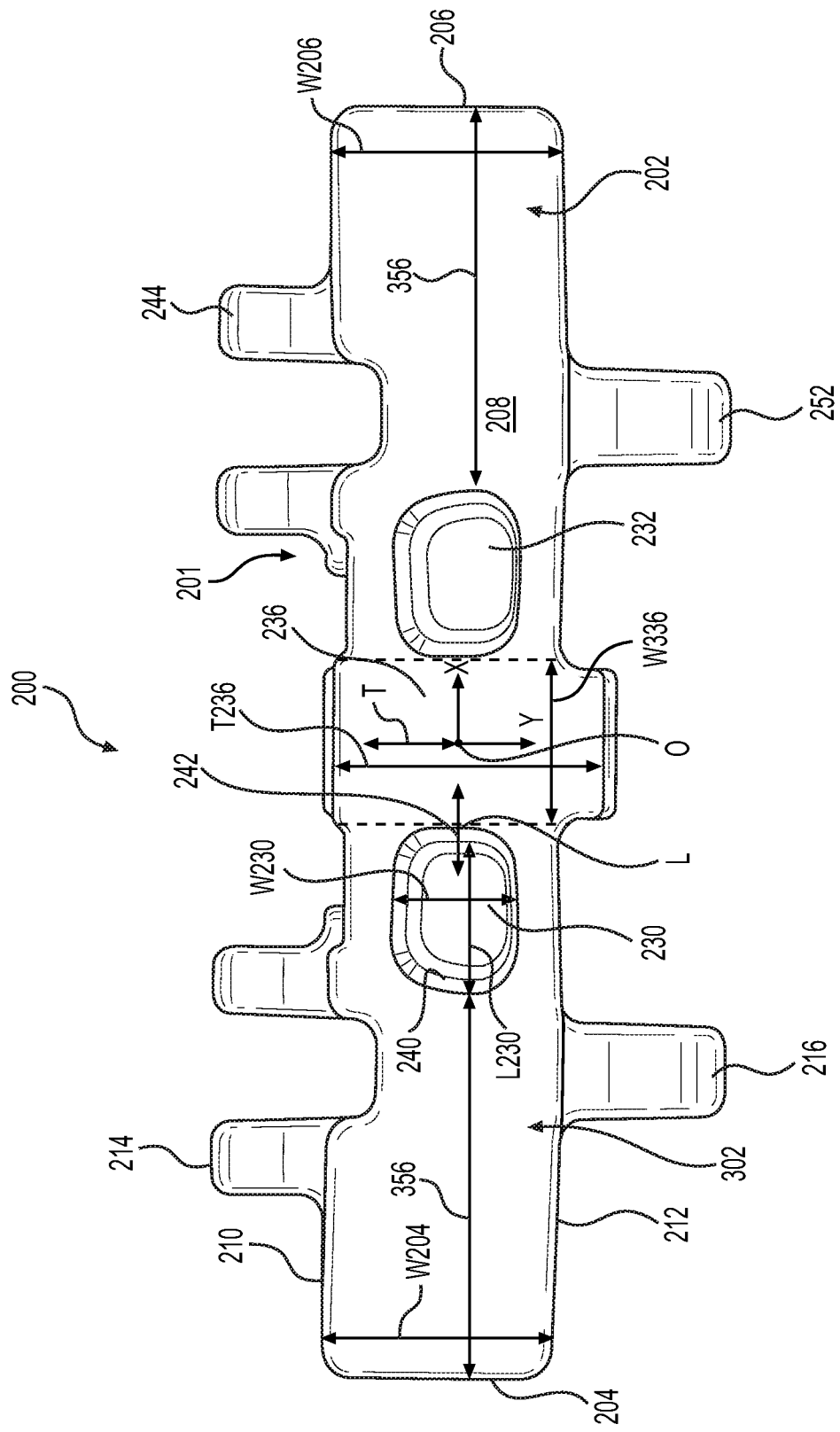
FIG. 4 is a bottom view of the track pad of FIG. 2.

For providing a point a reference, FIGS. 2 thru 4 show a Cartesian coordinate system with an origin O placed at the center of mass (may also be referred to as a centroid), with the X-axis parallel to the bores 215, 217, 245 of the lugs 214, 216, 244 and lateral direction L, the Y-axis parallel to the direction to the track chain travelling direction T, and the Z-axis parallel to the vertical direction when used on a machine 100.

Focusing now on FIGS. 2 thru 4, various features of the track chain member 200 that may help a track chain member 200 withstand the loads exerted on it without deformation or cracking will be discussed. As shown, the track chain member 200 (e.g. unitary track pad 201) may comprise a shoe member 202 defining a track chain traveling direction T and a lateral direction L perpendicular to the track chain traveling direction T. The shoe member 202 may further define a first lateral end 204 (may also be referred to as an outboard edge), a second lateral end 206, and a ground engaging surface 208 spanning from the first lateral end 204 to the second lateral end 206 along the lateral direction L and from the front edge 210 to the rear edge 212 along the track chain traveling direction T. The shoe member 202 may further comprise a first lug 214 extending from the shoe member 202 in a first direction (negative Y direction)

parallel to the track chain traveling direction T, a second lug 216 extending from the shoe member 202 in a second direction (positive Y direction) parallel to the track chain traveling direction T and opposite to the first direction (negative Y direction), a first rib 218 coupling the shoe member to the first lug 214, and a second rib 220 coupling the shoe member 202 to the second lug 216, defining a first side recess 222 between the first rib 218 and the second rib 220.

The first side recess 222 may extend from the exterior of the shoe member 202 and underneath the top surface 228 joining the first and the second lugs 214, 216. That is to say, the first top surface 228 may be at least partially parallel with the top boundary 247 of the first recess 222. The first recess 222 may be bound on the bottom by the shoe member 202. That is to say, the shoe member 202 may define a bottom boundary 248 of the first recess 222. Also, the first lateral end 204 may define a first lateral end width W204 along the track chain traveling direction T. The first side recess 222 may also span the majority of the first lateral end width W204 along the track chain traveling direction T. In other words, the width W222 of the first side recess may be 75% or more of the first lateral end width W204. Though not clearly shown in FIGS. 2 thru 4, the second lateral end 206 may be identically configured.

For the embodiment shown in FIGS. 2 thru 4, the first rib 218 and the second rib 220 have a first concave top surface 224 and a second concave top surface 226 respectively that span the majority of the distance along the height of the track chain member 200 (measured along the Z direction) from the shoe member 202 to the top surface 228 of the first and the second lugs 214, 216. This may not the case in other embodiments. As best seen in FIG. 3, the first top concave surface 224 or the second top concave surface 226 may define a radius of curvature ROC, ranging from 280 mm to 310 mm.

In addition as best seen in FIGS. 3 and 4, the track chain member 200 further defines a midplane (Y-Z plane) along the lateral direction L, a first bottom void 230 extending from the ground engaging surface 208 and a second bottom void 232 extending from the ground engaging surface 208. The first bottom void 230 may be disposed on one side laterally of the midplane (Y-Z plane) and the second bottom void 232 may be disposed on the other side laterally of the midplane (Y-Z plane), forming a support pillar 236 therebetween. The first bottom void 230 is spaced laterally away from the first side recess 222. As pointed out in FIG. 4, the first and the second side surfaces 240, 242 of the first bottom void 230 may form an oblique angle φ (e.g. 80-87 degrees) with respect to the lateral direction L or the track chain traveling direction T.

The support pillar 236 may define a support pillar height H236 (Z direction) and a support pillar width W236 (Y direction). A portion of the support pillar 236, such as the upper hardened region 237 may define an upper hardened region height H237 and a ratio of the upper hardened region height H237 to the support pillar height H236 may range from 10% to 25%. Hardening may be performed via induction hardening, etc. The support pillar height H236 may range from 275 mm to 325 mm and the support pillar width W236 may range from 180 mm to 250 mm in some embodiments.

It should be noted that the support pillar 236 may contain a void extending completely through the support pillar 236 along the track traveling direction T. In such a case, this void is to be ignored when considering the dimensions and ratios mentioned herein with regard to any support pillar discussed herein.

Also, the first bottom void 230 may define a first bottom void depth D230 in a direction perpendicular to the ground engaging surface 208 ranging from 200 mm to 350 mm. The second bottom void 232 may define a second bottom void depth D232 ranging from 200 mm to 350 mm. Also, the first bottom void 230 defines a first bottom void length L230 measured in lateral direction L ranging from 275 mm to 350 mm. The first bottom void 230 may also define a first bottom void width W230 measured in the track chain traveling direction T ranging from 180 mm to 250 mm. The support pillar 236 may define a support pillar thickness T236 along the track chain traveling direction T ranging from 350 mm to 450 mm.

Referring now to FIGS. 3 and 4, the track chain member 200 may include a third lug 244 extending from the shoe member 202 in the first direction parallel to the track chain traveling direction T, and a fourth lug 252 extending from the shoe member 202 in the second direction parallel to the track chain traveling direction T and opposite to the first direction. The track chain member 200 may further define a second top surface 229 spanning from the third lug 244 to the fourth lug 252, a third rib 254 coupling the shoe member 202 to the third lug 244, and a fourth rib 256 coupling the shoe member 202 to the fourth lug 252, defining a second side recess 258 between the third rib 254 and the fourth rib 256. The second side recess 258 may also extend from the exterior of the shoe member 202 and underneath the second top surface 229. The second lateral end 206 may also define a second lateral end width W206 along the track chain traveling direction T. The second side recess 258 may also span the majority of the second lateral end width W along the track chain traveling direction T.

In some embodiments, the first side recess 222 may extend all the way to the first bottom void 230 or it may not. In the embodiment shown in FIGS. 3 and 4, the first side recess 222, the second side recess 258, the first bottom void 230 and the second bottom void 232 are not in communication with each other. Instead a web 250 separates the bottom voids 230, 232 from the side recesses 222, 258.

The track chain member 200 may be symmetrical about the Y-Z axis in some embodiments. The track chain member 200 may be integrally formed, creating a track pad 201 or may be assembled using multiple components, etc. Any of the dimensions, angles or ratios discussed herein may be varied as needed or desired in other embodiments to be different than any particular values mentioned herein.

As discussed earlier herein, a track chain assembly 104 (see FIG. 1) may be assembled by interlocking a plurality of track chain members 200 that are similarly or identically configured such as using a series of track chain members 200 as shown in FIGS. 2 thru 4. Other configured track chain members such as master links and the like may also be attached to the plurality of identically or similarly configured track chain members.

Looking now at FIGS. 1 thru 4, the track chain assembly 104a, 104b may comprise a plurality of interlocking track chain members 200, such as a track pad 201, wherein each track chain member 200 defines a track chain traveling direction T, a lateral direction L perpendicular to the track chain traveling direction T, and includes a shoe member 302 defining a first lateral end 204, a second lateral end 206, and a ground engaging surface 208 spanning from the first lateral end 204 to the second lateral end 206. As depicted, a first rail member 310 may extend from the shoe member 302 disposed proximate the first lateral end 204, and a second rail member 312 extending from the shoe member 302 disposed proximate the second lateral end 206 spaced away from the first rail member 310, defining a central support pillar 313 therebetween. A first projection 352 and a second projection 354 are provided in the central support region 313, equally spaced longitudinally about the Y-Z plane, providing guidance for the rollers 140, 142, idler 134 and sprocket 136 of the machine 100, which pass between these projections 352, 354. As best seen in FIG. 3, the first projection 352 is disposed at least partially above the first bottom void 230 and the second projection 354 is disposed at least partially above the second bottom void 232.

Referring to FIGS. 2 and 3, the track chain member 200 may include a first rib 218 and a second rib 220 extending between the first rail member 310 and the first lateral end 204 of the shoe member 302. The first rib 218 and the second rib 220 may define a first side recess 322 therebetween. Similarly, there may be a third rib 254 and a fourth rib 256 extending between the second rail member 312 and the second lateral end 206 of the shoe member 302. The third rib 254 and the fourth rib 256 may define a second side recess 258 therebetween.

Looking at FIGS. 3 and 4, the track chain member 200 may also define a midplane (Y-Z plane) along the lateral direction L, a first bottom void 230 extending from the ground engaging surface 208 and a second bottom void 232 extending from the ground engaging surface 208. The first bottom void 230 may be disposed on one side laterally of the midplane (Y-Z plane) and the second bottom void 232 may be disposed on the other side laterally of the midplane (Y-Z plane), forming a support pillar 236 therebetween. The first and the second bottom voids 230, 232 may straddle the center support region 313. This may not be the case in other embodiments.

The first bottom void 230 may define a first bottom void length L230 along the lateral direction L ranging from 275 mm to 350 mm, and a width W230 measured along the track chain traveling direction T ranging from 180 mm to 250 mm. The first bottom void 230 is spaced from the first lateral end 204 the same distance 356 that the second bottom void 232 is spaced from the second lateral end 206. This distance 356 may range from 500 mm to 600 mm in certain embodiments. These dimensions may be varied as needed or desired in other embodiments. The configuration of the first and the second bottom voids and their placement may be varied as needed or desired to be different than what is shown in FIGS. 3 and 4 in other embodiments.

The first bottom void 230 defines a first bottom void depth D230 in a direction (Z direction) perpendicular to the ground engaging surface 208 ranging from 200 mm to 350 mm and the second bottom void 232 defines a second bottom void depth D232 in a direction (Z direction) perpendicular to the ground engaging surface 208 that is the same as the first bottom void depth D230. This may not be the case in other embodiments.

As best seen in FIG. 3, the support pillar 236 defines a support pillar height H236 and an upper hardened region 237 defining an upper hardened region height H237 and a ratio of the upper hardened region height H237 to the support pillar height H236 may range from 10% to 25%. As best seen in FIG. 4, the support pillar 236 may define a support pillar width W336 along the lateral direction L ranging from 275 mm to 350 mm. The support pillar 236 may be centered on the midplane (Y-Z plane). The support pillar may be differently configured and positioned in other embodiments.

Looking at FIGS. 2 and 3, the first rib 218 includes a first concave top surface 224, the second rib 220 includes a second concave top surface 226, the third rib 254 includes a third concave top surface 358, and the fourth rib 256 includes a fourth concave top surface 360.

The first bottom void 230, the second bottom void 232, the first side recess 322 and the second side recess 258 are not in communication with each other, being separated by a web 250 (may also be referred to a wall). This may not be the case in other embodiments. The first lateral end 204 and second lateral end 206 are shown to be upturned. This may not be the case in other embodiments.

Again, for any of the embodiments discussed herein, the values of dimensions, angles, and ratios may be varied to be different than anything shown in FIGS. 2 thru 4. Also, various features may be modified in configuration or omitted in various embodiments, etc.

INDUSTRIAL APPLICABILITY

In practice, a track chain assembly, track chain member and/or machine may be sold, manufactured, bought etc. and in the aftermarket or original equipment scenarios according to any of the embodiments discussed herein. That is to say, the machine may be sold with the track chain assembly, and/or track chain member according to embodiments described herein or the machine may be retrofitted, repaired, refurbished to use any of the embodiments discussed herein. The various components including, but not limited to the track chain members, may be manufactured from any suitable material such as cast iron, grey cast iron, steel, etc. The track chain member may be initially cast or forged and then additional features may be machined on the track chain member. For example, the bores of the lugs may be machined.

In one particular application, it has been determined that a particular material such with a higher content of carbon may be more durable when used but may be more prone to crack. Since there is a lack of obstructions in the main central void or any side recess and they are large enough to allow access, repair via welding or the like may be more easily performed.

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain member comprising:
 a shoe member defining an exterior, a track chain traveling direction, a lateral direction perpendicular to the track chain traveling direction, and a vertical direction that is perpendicular to the lateral direction and the track chain traveling direction, the shoe member further defining a first lateral end, a second lateral end, and a ground engaging surface spanning from the first lateral end to the second lateral end;
 a first lug extending from the shoe member in a first direction parallel to the track chain traveling direction;
 a second lug extending from the shoe member in a second direction parallel to the track chain traveling direction and opposite to the first direction;
 the track chain member further defining a first top surface spanning from the first lug to the second lug;
 a first rib coupling the shoe member to the first lug;
 a second rib coupling the shoe member to the second lug, defining a first side recess between the first rib and the second rib, the first side recess also extending laterally from the exterior of the shoe member and underneath the first top surface, the first lateral end defining a first lateral end width along the track chain traveling direction, the first side recess also spanning the majority of the first lateral end width along the track chain traveling direction; and
 wherein the track chain member further defines a midplane along the lateral direction, a first bottom void extending vertically from the ground engaging surface and a second bottom void extending vertically from the ground engaging surface, the first bottom void being disposed on one side laterally of the midplane and the second bottom void being disposed on the other side laterally of the midplane, forming a support pillar therebetween.

2. The track chain member of claim 1 wherein the first bottom void is spaced laterally away from the first side recess.

3. The track chain member of claim 2 further comprising:
 a third lug extending from the shoe member in the first direction parallel to the track chain traveling direction;
 a fourth lug extending from the shoe member in the second direction parallel to the track chain traveling direction and opposite to the first direction;
 the track chain member further defining a second top surface spanning from the third lug to the fourth lug;
 a third rib coupling the shoe member to the third lug; and
 a fourth rib coupling the shoe member to the fourth lug, defining a second side recess between the third rib and the fourth rib, the second side recess also extending laterally from the exterior of the shoe member and underneath the second top surface, the second lateral end defining a second lateral end width along the track chain traveling direction, the second side recess also spanning the majority of the second lateral end width along the track chain traveling direction.

4. The track chain member of claim 2 wherein the support pillar defines a support pillar height and an upper hardened region defining a upper hardened region height and a ratio of the upper hardened region height to the support pillar height ranges from 10% to 25%.

5. The track chain member of claim 4 wherein the first bottom void defines a first bottom void depth in a direction perpendicular to the ground engaging surface ranging from 200 mm to 350 mm, the second bottom void defines a second bottom void depth ranging from 200 mm to 350 mm, and the support pillar defines a support pillar thickness along the track chain traveling direction ranging from 350 mm to 450 mm.

6. A track chain member comprising:
 a shoe member defining an exterior, a track chain traveling direction, a lateral direction perpendicular to the track chain traveling direction, and a vertical direction that is perpendicular to the lateral direction and the track chain traveling direction, the shoe member further defining a first lateral end, a second lateral end, and a ground engaging surface spanning from the first lateral end to the second lateral end;
 wherein the track chain member further defines a midplane along the lateral direction, a first bottom void extending vertically from the ground engaging surface and a second bottom void extending vertically from the ground engaging surface, the first bottom void being disposed on one side laterally of the midplane and the second bottom void being disposed on the other side laterally of the midplane, forming a support pillar therebetween.

7. The track chain member of claim 6 further comprising:
 a first lug extending from the shoe member in a first direction parallel to the track chain traveling direction;
 a second lug extending from the shoe member in a second direction parallel to the track chain traveling direction and opposite to the first direction;
 the track chain member further defining a first top surface spanning from the first lug to the second lug;
 a first rib coupling the shoe member to the first lug; and
 a second rib coupling the shoe member to the second lug, defining a first side recess between the first rib and the second rib, the first side recess also extending laterally from the exterior of the shoe member and underneath the first top surface.

8. The track chain member of claim 7 further comprising:
 a third lug extending from the shoe member in the first direction parallel to the track chain traveling direction;
 a fourth lug extending from the shoe member in the second direction parallel to the track chain traveling direction and opposite to the first direction;
 the track chain member further defining a second top surface spanning from the third lug to the fourth lug;
 a third rib coupling the shoe member to the third lug; and
 a fourth rib coupling the shoe member to the fourth lug, defining a second side recess between the third rib and the fourth rib, the second side recess also extending laterally from the exterior of the shoe member and underneath the second top surface.

9. The track chain member of claim 6 wherein the support pillar defines a support pillar height and an upper hardened region defining a upper hardened region height and a ratio of the upper hardened region height to the support pillar height ranges from 10% to 25%.

10. The track chain member of claim 9 wherein the first bottom void defines a first bottom void depth in a direction perpendicular to the ground engaging surface ranging from 200 mm to 350 mm, the second bottom void defines a second bottom void depth ranging from 200 mm to 350 mm, and the support pillar defines a support pillar thickness along the lateral direction ranging from 350 mm to 420 mm.

11. A track chain assembly comprising:
a plurality of interlocking track chain members wherein each track chain member defines a track chain traveling direction, a lateral direction perpendicular to the track chain traveling direction, and a vertical direction that is perpendicular to the track chain direction and the lateral direction, and includes
a shoe member defining a first lateral end, a second lateral end, and a ground engaging surface spanning from the first lateral end to the second lateral end;
a first rail member extending from the shoe member disposed proximate the first lateral end, and a second rail member extending from the shoe member disposed proximate the second lateral end spaced away from the first rail member, defining a central support region therebetween;
a first rib and a second rib extending between the first rail member and the first lateral end of the shoe member, defining a first side recess therebetween;
a third rib and a fourth rib extending between the second rail member and the second lateral end of the shoe member, defining a second side recess therebetween;
wherein each track chain member further defines
a midplane along the lateral direction, a first bottom void extending vertically from the ground engaging surface and a second bottom void extending vertically from the ground engaging surface, the first bottom void being disposed on one side laterally of the midplane and the second bottom void being disposed on the other side laterally of the midplane, forming a support pillar therebetween.

12. The track chain assembly of claim 11 wherein the first bottom void defines a first bottom void length along the lateral direction ranging from 275 mm to 350 mm.

13. The track chain assembly of claim 12 wherein the first bottom void defines a width measured along the track chain traveling direction ranging from 180 mm to 250 mm.

14. The track chain assembly of claim 13 wherein the first bottom void is spaced from the first lateral end the same distance that the second bottom void is spaced from the second lateral end.

15. The track chain assembly of claim 14 wherein the first bottom void defines a first bottom void depth in a direction perpendicular to the ground engaging surface and the second bottom void defines a second bottom void depth in a direction perpendicular to the ground engaging surface that is the same as the first bottom void depth.

16. The track chain assembly of claim 15 wherein the support pillar defines a support pillar height and an upper hardened region defining a upper hardened region height and a ratio of the upper hardened region height to the support pillar height ranges from 10% to 25%.

17. The track chain assembly of claim 16 wherein the support pillar defines a support pillar width along the lateral direction ranging from 275 mm to 350 mm and is centered on the midplane.

18. The track chain assembly of claim 17 wherein each track chain member includes a first projection disposed at least partially above the first bottom void and a second projection disposed at least partially above the second bottom void.

19. The track chain assembly of claim 11 wherein the first rib includes a first concave top surface, the second rib includes a second concave top surface, the third rib includes a third concave top surface, and the fourth rib includes a fourth concave top surface.

20. The track chain assembly of claim 11 wherein the first bottom void, the second bottom void, the first side recess and the second side recess are not in communication with each other.

* * * * *